Patented July 12, 1932

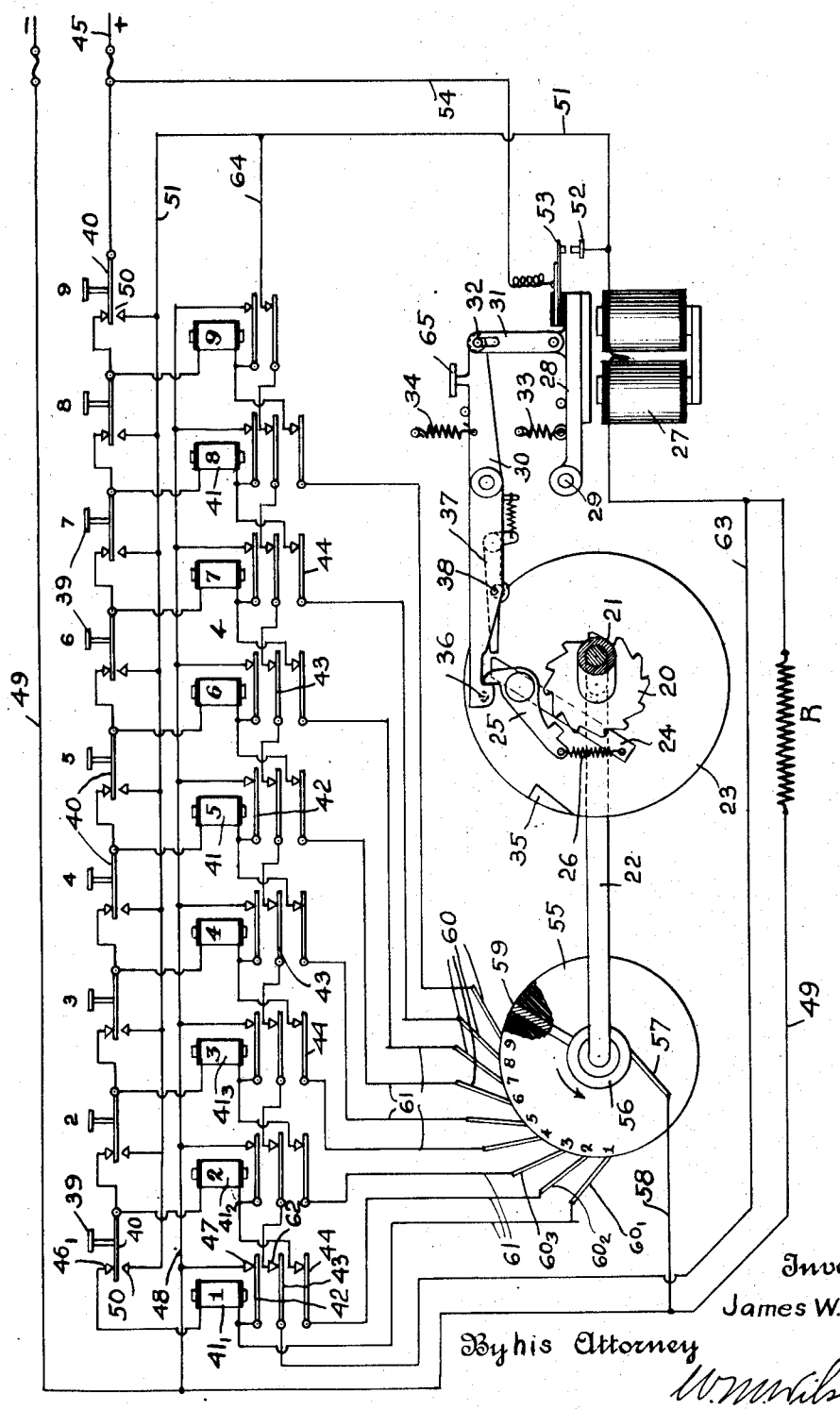

1,866,996

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

ELECTRIC CONTROL MECHANISM

Application filed December 13, 1927. Serial No. 239,742.

The present invention relates generally to improvements in controlling devices for determining the number of cycles of operation given to a shaft or other operating member, and more particularly to improvements whereby such devices may be controlled electrically.

Such devices may find their application in many arts and used in various relations, since broadly speaking it may be desirable under certain conditions to give a shaft a single cycle of operation, while a change in the conditions specified may require more than one cycle of operation to perform certain functions.

For example, the present invention may be employed in connection with tabulating machines which are designed to operate upon successive records and accumulate and print items represented on the records by differentially located perforations. In addition to representing items the cards contain classification data, and in some systems these may be divided into groups, designated as the major group, intermediate group and minor group and a change of the classification group causes the machine to automatically or manually control the taking of a total. It is usually desirable that the major, intermediate and minor group of control be taken successively. In order to save operating time and to secure other advantages it is desirable to provide for only as many total taking cycles as are necessary to print the required totals. By embodying the present invention the total taking cycles may be manually or automatically initiated, the extent or number of cycles depending upon the particular device operated.

Again, in accounting practice it may be necessary to employ an accounting machine to multiply, and ordinarily this is effected by the method of successive addition, that is, the multiplicand is set up on the keyboard and the machine operated according to the digit of the multiplier. By the employment of the present invention depression of a single manipulative device, such as a key, will initiate the operation of the machine and automatically predetermine the number of operations of the machine to accomplish the above function and stop it at the completion of the desired number of cycles of operation.

The principal object of the invention then is to provide a controlling system for controlling the number of cycles of operation of a driving shaft or operating member.

Another object of the present invention is to provide controlling devices whereby the number of cycles of operation of an operating member may be electrically controlled.

Another object of the invention is to provide a mechanism having provision for effecting repeated operations of the same in combination with a controlling system having provisions for selectively initiating different predetermined numbers of repeat operations of the mechanism.

Another object of the invention is to provide a mechanism having provisions for effecting repeated operations of the same in combination with a plurality of controlling devices adapted to initiate different predetermined numbers of repeat operations of the mechanism.

Another object of the invention is to provide a plurality of controlling devices arranged in serial order and adapted to control repeated operations of a mechanism determined in number according to the serial number of the control device which initiates the operation.

More specifically it is an object of the present invention to provide a plurality of electrically controlled instrumentalities, preferably in the form of relays which are interlocked serially. Associated with the control relays are a corresponding number of contact members, also interlocked serially, and electrically connected with the control relays in such a manner that they may change the electrical condition of one or more control relays, the number depending upon which of the contact members of the series is operated. The contact members referred to control means for initiating the operation of the member to be driven and by the provision of auxiliary contact members the affected relays are successively restored to their normal electrical condition, and when this condition obtains the operation of the driven member ceases.

The invention will be explained in connection with a simple mechanism consisting of a driven shaft which may be coupled to a driving shaft for one of a plurality of revolutions through a one revolution clutch. It will be further assumed that a plurality of contact members, which may be in the form of keys are provided, the operation of each of which controls the clutch in a different manner to effect a number of revolutions of the driven shaft corresponding to the key or manipulative device which controls the operation. It should be understood, however, that none of these devices per se constitutes the essence of the invention, as any or all of them could be replaced by other devices which would serve the broad purpose of the combination equally as well.

These and incidental objects which will appear hereinafter will be clear from the following detailed description which should be read in connection with the accompanying drawing.

The appended drawing shows the circuit diagram of the preferred form of controlling devices and for the purpose of illustrating the present invention are shown in connection with mechanism for controlling the revolutions of a shaft.

Referring to the drawing 20 designates a ratchet wheel fixed upon a sleeve 21 loosely rotating upon a commutator shaft 22. The sleeve 21 is adapted to be continuously driven either directly or through an intermediate transmission by an electric motor or other prime mover.

Any suitable form of clutch mechanism for connecting the sleeve 21 and shaft 22 together may be provided and the preferred construction comprises the type shown in the copending application of Clair D. Lake, Serial No. 639,153, filed May 5, 1923. In the form referred to, fast on the shaft 22 is a disk 23 on the face of which is secured a block 24 which in turn carries a pivoted clutch dog 25. This clutch dog 25 is in the plane of the ratchet wheel 20 and is normally drawn into engagement therewith by means of a spring 26. Engagement of the clutch dog 25 with the ratchet wheel 20 is permitted when a relay magnet 27 is energized. The armature 28 of this magnet is pivoted at 29 and is connected to a lever 30 by a link 31, the upper end of the link 31 having a pin and slot connection 32 to one arm of the lever 30. The other arm of the lever 30 is notched to engage the tail of the clutch dog 25.

Upon the energization of the magnet 27 link 31 is drawn downwardly against the tension of a spring 33 and by the pin and slot connection 32 rocking lever 30 in a clockwise direction against the tension of a spring 34. Spring 26 thereupon draws the clutch dog 25 into engagement with the ratchet wheel 20. Subsequently to this relationship the disk 23 and therefore the shaft 22, will rotate in unison with the sleeve 21. Just before a complete single or multiple revolution of these parts the magnet will become deenergized permitting the notched arm of the bell crank lever 30 to reengage the clutch dog 25 and disengage the same from the ratchet wheel 20.

To insure the armature 28 being released from the clutch magnet 27 a mechanical knock-off is provided which comprises a camming projection 35 which is mounted on the face of the disk 23. This camming projection 35 during the revolution of the disk 23 is adapted to engage over a pin 36 which is disposed on one arm of the lever 30 to rock the bell crank lever 30 counterclockwise and disengage the armature 28 from the magnet 27.

To prevent a possible rebound of the clutch dog 25 a supplementary pawl 37 is provided which is pivotally mounted upon the lever 30 and spring pressed downwardly limited in this movement by a pin 38 coacting with an aperture in the pawl 37. This pawl upon the revolution of the clutch dog 25 is adapted to fall in behind the dog and prevent rebounding of the same with the possible disengagement from control of the lever 30.

Coming now more particularly to the present invention 39 designates a series of interlocked members which may be, for example, contact members or relays but for the purpose of explaining the present invention may be considered as keys to which are attached spring blades 40 for automatically returning the depressed keys to normal after a depression thereof. The key caps carry suitable indicia for designating the number of revolutions of the shaft 22 the particular key controls. Reference will hereinafter be made to particular key caps 39, blades 40, magnets 41, or brushes 60, etc. by subscript designations. The group of elements are identified by the general reference numeral and the subscript designates the serial number or order of that element in the group. Reference character 41 designates a series of relay magnets each of which is correlated with its particular key 39. Each magnet 41 is adapted to attract a plurality of armatures 42, 43, 44 which are preferably connected together for simultaneous movement, but electrically, are independent of each other.

Relay magnets 41 are normally energized by current passing through the positive side of the line 45, through blades 40 and upper contacts 46, through each relay magnet 41, corresponding upper armature 42, related contact point 47 and by connecting wire 48 to the negative side of the line 49.

When the selected key 39 is depressed a circuit is established through the clutch relay magnet 27 traced as follows: from the positive side of the line 45 directly to the blade 40 of the "1" key, or serially through the blades 40 and upper contacts 46 to the lower contact point 50 related to the key depressed, thence through wire 51, through magnet 27, resistance R thence to the negative line wire 49.

To further establish a circuit through relay magnet 27 after the depressed key is returned to normal a stick circuit comprising a lower contact 52 and upper contact 53 carried by a plate insulated from the armature 28 is provided. Contacts 52, 53 when closed, connect the relay 27 to the positive side of the line by wire 54 when broken by the previous connection comprising the lower contact 50 and blade 40.

When a key, such as the "1" key for example is initially depressed the corresponding relay magnet 41 is deenergized since it will be obvious that when the "1" key is depressed the circuit through relay 41 will be broken at upper contact 46 and blade 40 permitting the corresponding armatures 42, 43 and 44 to drop downwardly by gravitation or spring action and further disconnecting the circuit at armature 42 and upper contact 47. As the depressed key returns to normal the circuit connection at contact 46 and blade 40 will be resumed but relay magnet 41 will be cut off from the negative side of the line 49 by the now broken connection comprising upper armature 42 and contact point 47. The circuit through magnet 41 is re-established by auxiliary means to be hereinafter described.

Energization of relay clutch magnet 27 continues until at some part of a single or multiple cycle it is deenergized by preferably momentarily short circuiting the same subsequently to re-establishing the circuit through one of the deenergized magnets 41. The preferred form for accomplishing the above comprises a disk 55 of bakelite or some other insulating medium securely fixed to shaft 22. Rigidly secured to the disk 55 is a collector ring 56 in electrical contact with a brush 57 electrically connected by wire 58 to the negative of the line 49. Also in electrical contact with the collector ring 56 is a radially disposed contact stud 59 carried by the disk 55 and in electrical contact with the collector ring 56 but is adapted to contact with one of a plurality of brushes 60 during various portions of a cycle of operation of disk 55.

Still assuming that the "1" key has been depressed and returned, remembering that relay magnet $41_1$ is now deenergized and the clutch connection already established, rotation of the disk 55 will cause point 59 to contact successively with the brushes 60. When point 59 contacts brush $60_1$ a circuit through magnet relay $41_1$ will be established traced as follows: from the negative of the line wire 49, wire 58, brush 57, ring 56, contact point 59, the $60_1$ brush, and thence by a wire 61 to the relay magnet $41_1$; the other side of the magnet $41_1$ having a direct connection through restored key $39_1$ to the positive side of the line.

As the armatures 42, 43 and 44 are attracted by related magnet $41_1$ armature 42 contacting with upper contact 47 will hold relay magnet 41 energized after point 59 leaves the $60_1$ brush. As the intermediate armature 43 contacts with point 62 it will short circuit relay magnet 27 by a shunt connection traced as follows: wire 63, armature 43, contact 62, thence serially through the armatures 43 and contacts 62 associated with the normally energized relays, wires 64 and 51 to the magnet 27.

The shunt circuit established will by demagnetization of relay 27 disconnect contact points 52 and 53 permitting the notched lever 30 to reengage the clutch dog 25 and disengage the same from the ratchet wheel at the end of a single revolution of the sleeve 21 and shaft 22.

When relay magnet 27 is short circuited a circuit will be established with the resistance R across the line which is of such a value that the current in the line is limited to prevent blowing of the fuses interposed in the main lines.

The action of the parts when keys other than the "1" key are depressed is as follows: Assuming that the "3" key 39 is depressed and restored, magnets $41_1$, $41_2$ and $41_3$ will be simultaneously deenergized so that the groups of armatures 42, 43 and 44 will drop downwardly. Upon the first cycle of operation of the shaft 22, relay magnet $41_1$ will be energized and held energized precisely in the same manner as before. In this instance, however, as armature 43 of relay $41_1$ contacts 62 the shunt circuit for clutch relay magnet will not be made since the circuit will be interrupted at the armatures 43 and contacts 62 associated with the deenergized relay magnets $41_2$ and $41_3$. This will result in retaining the lever 30 in its upward position where it has no control over clutch dog 25 permitting a subsequent revolution of shaft 22. During the second cycle, point 59 contacting with brush $60_2$ will energize relay magnet $41_2$ but the shunt circuit will not, however, be made due to the break at armature 43 and contact 62 related to deenergized relay magnet $41_3$. During the third cycle of operation relay magnet $41_3$ will be energized as point 59 contacts brush $60_3$ and at this time the shunt circuit will be established through the series of armatures 43 and contacts 62, deenergizing relay magnet 27 so that the clutch connection will be disabled at the termination of the third cycle.

The operation of the parts when other keys are operated is precisely the same so that the clutch connection is disabled only when the deenergized relay magnets are successively energized and as many revolutions of the shaft 22 will ensue as there are relay magnets to be energized.

In order that the clutch connection may be established independently of keys 39 lever 30 is provided with a key cap 65 which when depressed will produce the same results as when relay magnet 27 is energized. Spring 34 automatically restores lever 30 to normal to disable the clutch at the end of the cycle. The pin and slot connection 32 permits manual depression of key 65 without affecting operation of the relay magnet 27.

For the purpose of illustrating and explaining the present invention controlling devices for controlling from one to ten revolutions of the driving shaft are shown but this manner is not the essence of the invention and may be increased or decreased since such changes merely necessitates the addition or subtraction of units which are duplicates of each other.

The invention has now been described in connection with what is at present, believed to be the preferred embodiment, but it will be understood that many modifications and rearrangements will readily occur to those skilled in the art and which are well within the scope of the present invention. It is the intention therefore, to be limited only as indicated by the scope of the following claims:

I claim:

1. The combination with mechanism having operating means for repeatedly operating the same a plurality of revolutions without interruption, control mechanism for said operating means including a plurality of common elements each element alone having connections for predetermining a different number of repeat revolutions of said mechanism and means whereby each element initiates the operation of said operating means.

2. The combination with mechanism having operating means for repeatedly operating the same, control mechanism for said operating means including a plurality of interlocked elements each element alone having connections for predetermining a different number of repeat operations of said mechanism and means whereby each element initiates the operation of said means.

3. The combination with mechanism having operating means for repeatedly operating the same, control mechanism for said operating means including a plurality of interlocked elements arranged in serial order each for predetermining a different number of repeat operations of said mechanism and means whereby each element initiates the operation of said means.

4. In a control system comprising means for effecting repeated revolutions without interruption of an operating mechanism, control members arranged serially and means whereby each member alone calls said operating mechanism into operation from rest and for a different number of repeat revolutions according to the serial order of the control members.

5. A split control system for an operating mechanism including means for effecting repeated and uninterrupted revolutions of operation of the operating mechanism, means including a plurality of serially arranged control members each of which is adapted to initiate the operation of said operating mechanism and means controlled by the control members for effecting a number of repeat revolutions according to the serial order of the control members.

6. A control system comprising means for effecting repeated uninterrupted revolutions of operation of an operating mechanism, control members arranged in serial order, means called in operation by one of said control members for performing a number of repeat revolutions of operation of said operating mechanism, and means controlled by the control members for limiting the number of repeat revolutions of the operating mechanism to the serial order of the control members.

7. In a control system comprising means for effecting repeated operations of an operating mechanism, a series of elements for initiating an operation of the operating mechanism said elements being interlocked whereby the elements control the operation of those lower in order, and means for controlling repeated operations of the operating mechanism in accordance with the number of elements controlled.

8. In a control system including means for effecting repeated operations of an operating mechanism, a series of elements for initiating an operation of the operating mechanism, said elements being interlocked whereby the elements control the operation of those lower in order, and means for effecting repeated operations of the operating mechanism in accordance with the number of elements controlled.

9. In a control system including means for effecting repeated operations of an operating mechanism, a plurality of interconnected controlling elements arranged in serial order each of which is adapted to initiate operations of the operating mechanism, and means controlled by the elements for limiting the repeat operations of the operating mechanism in accordance with the serial order of the control elements.

10. In a control system including means for effecting repeated operations of an operating mechanism, a plurality of elements arranged in serial order, means for interconnecting said elements whereby each element controls the elements of lower order, and means for effecting repeated operations of the operating mechanism in accordance with the number of elements controlled.

11. In a control system including means for effecting repeated operations of an operating mechanism, a plurality of elements arranged in serial order each of which is adapted to initiate an operation of the operating mechanism, means for interconnecting said elements whereby each element controls the elements of lower order, and means for effecting repeated operations of the operating mechanism in accordance with the number of elements controlled.

12. The combination with mechanism having means for effecting increments of movement to a member, control means therefor comprising a plurality of interconnected devices arranged in serial order, means whereby the operation of a selected device controls those lower in order, and means whereby the first mentioned means is operated according to the number of devices controlled.

13. In a device of the character described the combination of a motor controlling mechanism, a plurality of settable controlling elements each of which is adapted to render said motor controlling mechanism effective and means for controlling the motor controlling mechanism in accordance with the number of controlling elements set.

14. In a device of the character described the combination of a motor controlling mechanism, a plurality of settable controlling elements comprising relays each of which is adapted to render said motor controlling mechanism effective and means for controlling motor controlling mechanism in accordance with the number of relays set.

15. In a device of the character described the combination of means for repeatedly driving an operating mechanism, a plurality of relays arranged in serial order and adapted to initiate the operation of the driving means and means whereby the repeat operations of the driving mechanism are controlled in accordance with the serial order of the relays.

16. In a device of the character described comprising in combination an operating mechanism and means for repeatedly driving the same, a plurality of relays arranged in serial order and interlocked whereby each relay may control those lower in order and means common to each relay for initiating operation of the driving means and controlling the same in accordance with the number of relays controlled.

17. In a device of the character described comprising in combination, a coupling means, a series of controlling elements adapted to render the coupling means effective, a plurality of relay magnets one or more of which are deenergized by the controlling elements, and means for rendering the coupling means ineffective after all the relay magnets are successively energized.

18. In a revolution controlling device comprising in combination, a shaft coupling means, a main relay for rendering the shaft coupling means operative or inoperative, a series of elements, a corresponding number of supplemental relays, means controlled by the elements for deenergizing one or more supplemental relays and energizing the main relay and means for deenergizing the main relay after the supplemental relays are successively energized.

In testimony whereof I hereto affix my signature.

JAMES W. BRYCE.